United States Patent

[11] 3,601,905

[72] Inventor Alan Epstein
           New York, N.Y.
[21] Appl. No. 5,585
[22] Filed Jan. 26, 1970
[45] Patented Aug. 31, 1971
[73] Assignee Programming Sciences Corporation
           New York, N.Y.

[54] COMPUTER TEACHING MACHINE
     4 Claims, 5 Drawing Figs.
[52] U.S. Cl. ............................................. 35/13
[51] Int. Cl. ........................................ G09b 25/02
[50] Field of Search ........................................ 35/13, 19
                                                         A, 30, 8, 10

[56]         References Cited
         UNITED STATES PATENTS
3,123,921  3/1964  Bartelson ..................... 35/19 A
3,269,031  8/1966  Pratt ............................. 35/13

Primary Examiner—Wm. W. Grieb
Attorney—Kane, Dalsimer, Kane, Sullivan and Kurucz ABSTRACT: A device is provided for teaching the operation of an electronic computer. The device includes a mock control panel display having an overall configuration and appearance substantially identical to that of the display of the actual computer. The mock display includes simulated light and control elements of like type and kind to those of the actual computer. A projector is provided, designed to project an image viewable from the front of the mock display thereby causing portions of the mock display to resemble an illuminated light array of the computer display.

INVENTOR
ALAN EPSTEIN

BY
Kane, Dalsimer, Kane, Sullivan & Kurucz
ATTORNEYS

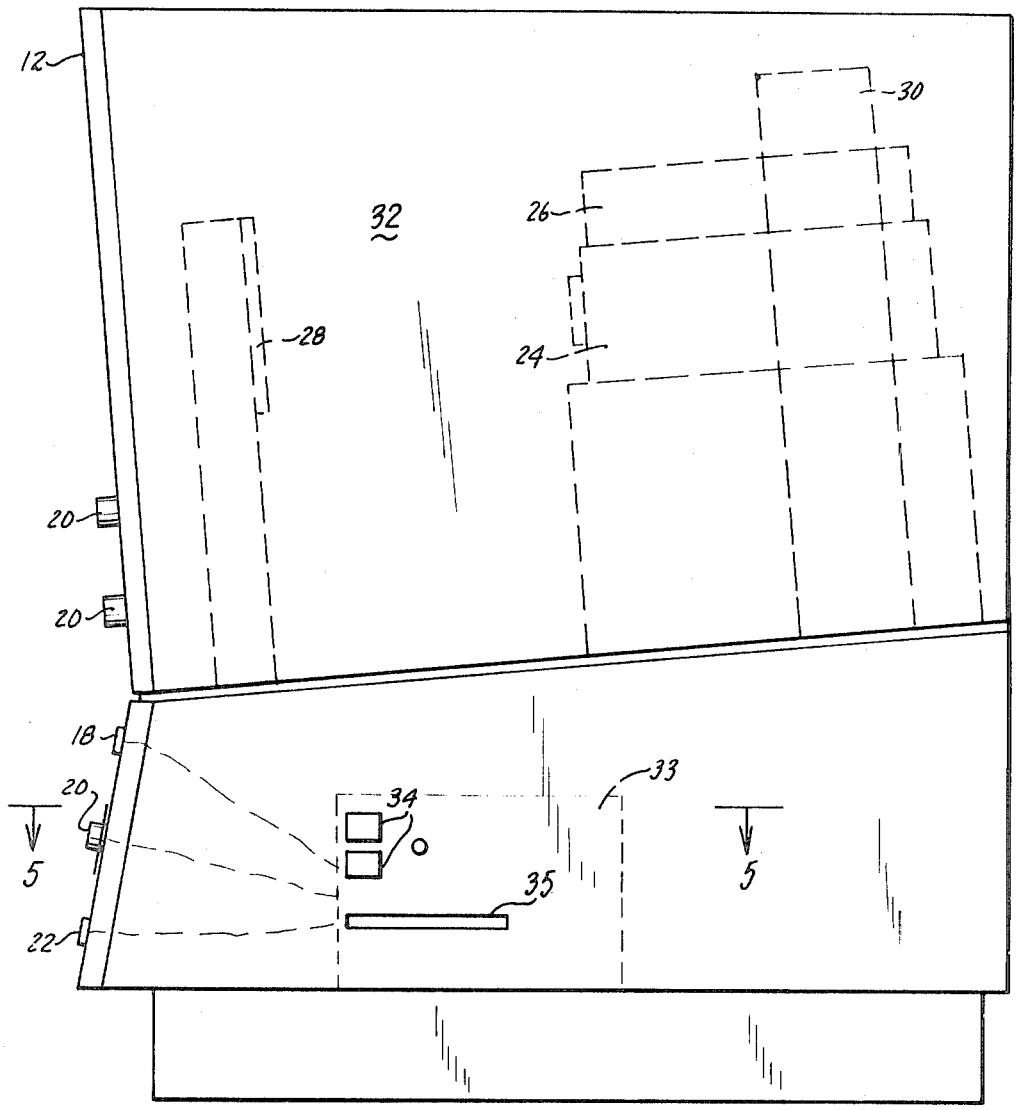

3,601,905

COMPUTER TEACHING MACHINE

BACKGROUND OF THE INVENTION

The present invention relates to a teaching machine adapted for use in instructing the operation of electronic equipment and particularly computers.

In most cases, computer operators are not concerned with the internal workings of the computer and need only be taught that for a particular manipulation of the various control elements of the computer a particular response will result requiring the operator to take some further action. The "further action" may comprise another manipulative step or the repetition of the last step in the event an error was committed or false information fed into the machine. In any event, all the operator need know is what action on her part is required to obtain the particular computer response desired or in response to the computer response obtained and to be able to determine the action required from the outward condition of the computer (i.e., what lights on the computer console are aglow).

It is, therefore, the principle object of the present invention to provide a simulated computer console having a front display panel and a set of controls (i.e., knobs, switches, etc.) identical to those of an actual computer which produces visual responses to predetermined manipulative steps of the controls identical to those produced by an actual computer in response to the same manipulative steps.

SUMMARY OF THE INVENTION

The above and other beneficial objects and advantages are attained in accordance with the present invention by providing a teaching machine for instructing the manual operation of a computer, which includes a support structure generally simulating the actual computer console in size and shape. A mock control panel display substantially identical in size and shape to the display of an actual computer is provided supported on the structure in proper position. The mock display includes a plurality of areas, each of the areas occupying a position corresponding to that of a light on the actual computer display. Similarly, a plurality of mock control elements consisting of knobs, push buttons, switches, etc. equal in like and kind to the control elements of the actual computer, are provided. The teaching machine further includes means for projecting an image on the areas causing the areas receiving an image to resemble an illuminated light and circuit, means interconnecting the mock control elements, and projecting means so that when the control elements are set in pattern identical to a particular setting of the control elements of an actual computer, the projecting means projects an image on the display areas causing the mock panel display to resemble the display of an actual computer whose control elements were identically set.

BRIEF DESCRIPTION OF THE DRAWINGS

In the accompanying drawings:

FIG. 4 is a side elevational view of the teaching device; and,

FIG. 5 is a fragmentary, diagrammatic side elevational sectional view taken along reference 5—5 of FIG. 4 in the direction indicated by the arrows.

DETAILED DESCRIPTION OF THE PREFERRED EMBODIMENT

Figure 2:
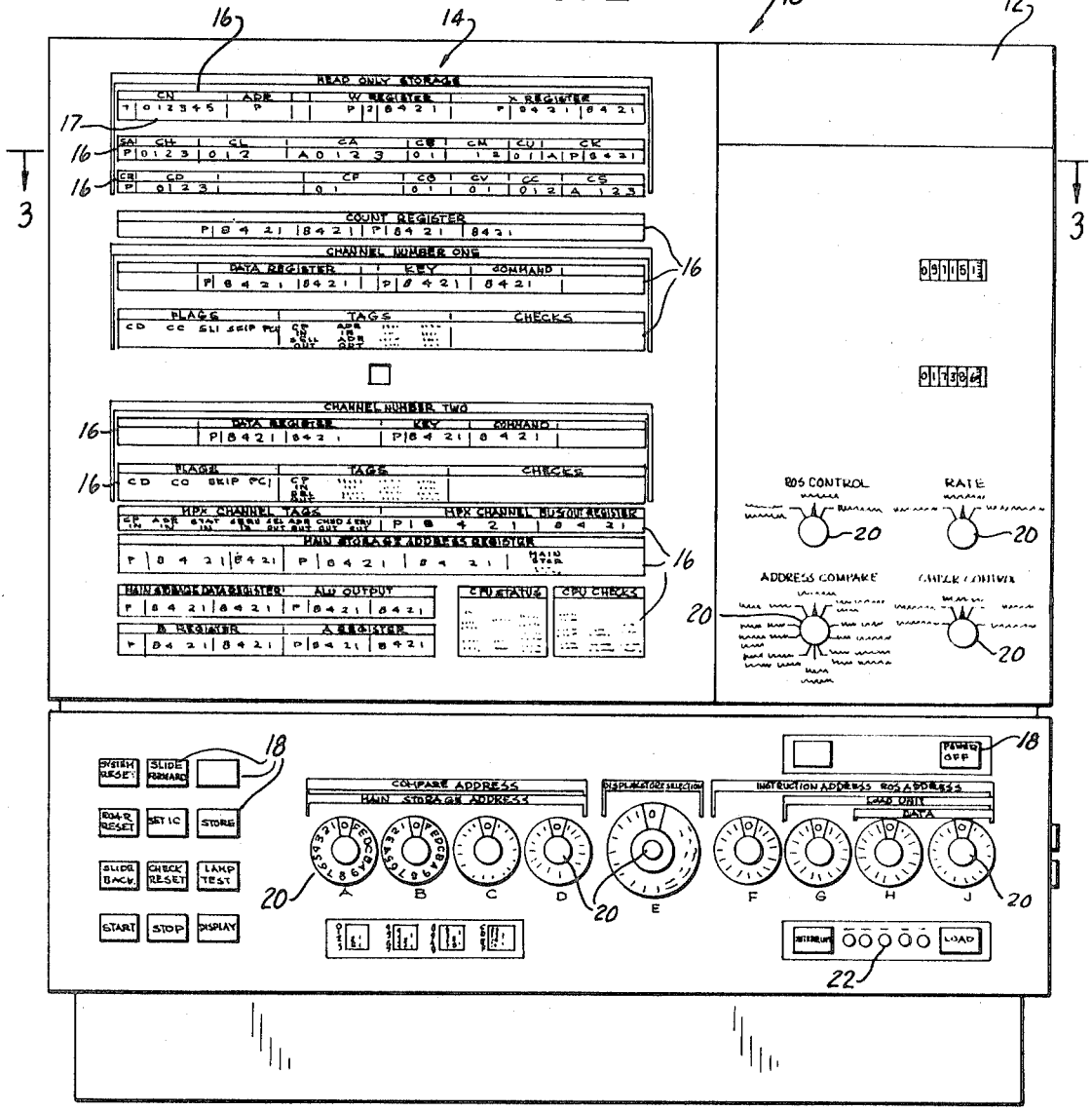
FIG. 2 is a front elevational view of the front display panel of the teaching device.

The present invention relates to a computer simulator 10, which is illustrated in the accompanying drawings, wherein similar components bear the same reference numerals throughout the several views. The computer simulator 10 of this preferred embodiment has a front panel 12, illustrated in FIG. 2, which is substantially identical to that of the display panel of an actual computer, such as the "System 360" console produced by the International Business Machine Company. The front panel 12 includes a display 14, which comprises a plurality of elongated sections 16 extending over a major portion of the panel. Each section 16 bears a designation such as "Read Only Storage," "Data Register," etc. The designations on the actual computer are illuminated and adapted to glow during appropriate periods of the computer cycle. In the actual IBM 360 computer, each of the sections 16 includes a plurality of subsections 17 bearing an alphabetic or numeric representation and formed of a lightbulb, reflector, nixie tube or the like adapted to glow during different phases of operation of the computer. The sections 16 of the present simulator are also divided into subsections 17. As will be explained in more detail, the sections and subsections 16 and 17 of the present simulator comprise areas of translucent material.

Front panel 10 also includes a plurality of control elements which are identical in like and kind to the control elements of the IBM Systems 360 Computer. Thus, the present device includes various block-type pushbutton switches 18, each bearing a designation identical to that of the corresponding button on the actual IBM computer, rotary selectors 20, again of the same type and bearing indicia identical to that of the actual IBM console, and additional pushbuttons 22. Thus, from outward appearance the front panel of the present simulator is substantially identical to the front panel of the corresponding actual computer.

As was previously mentioned, the front panel of the present device does differ from the front panel of the corresponding computer in one important respect. In place of the lightbulbs or other similar devices which appear on the display panel of the actual computer, the present device is provided with translucent areas occupying the same relative position on the mock display which is formed of an opaque material.

Figure 3:
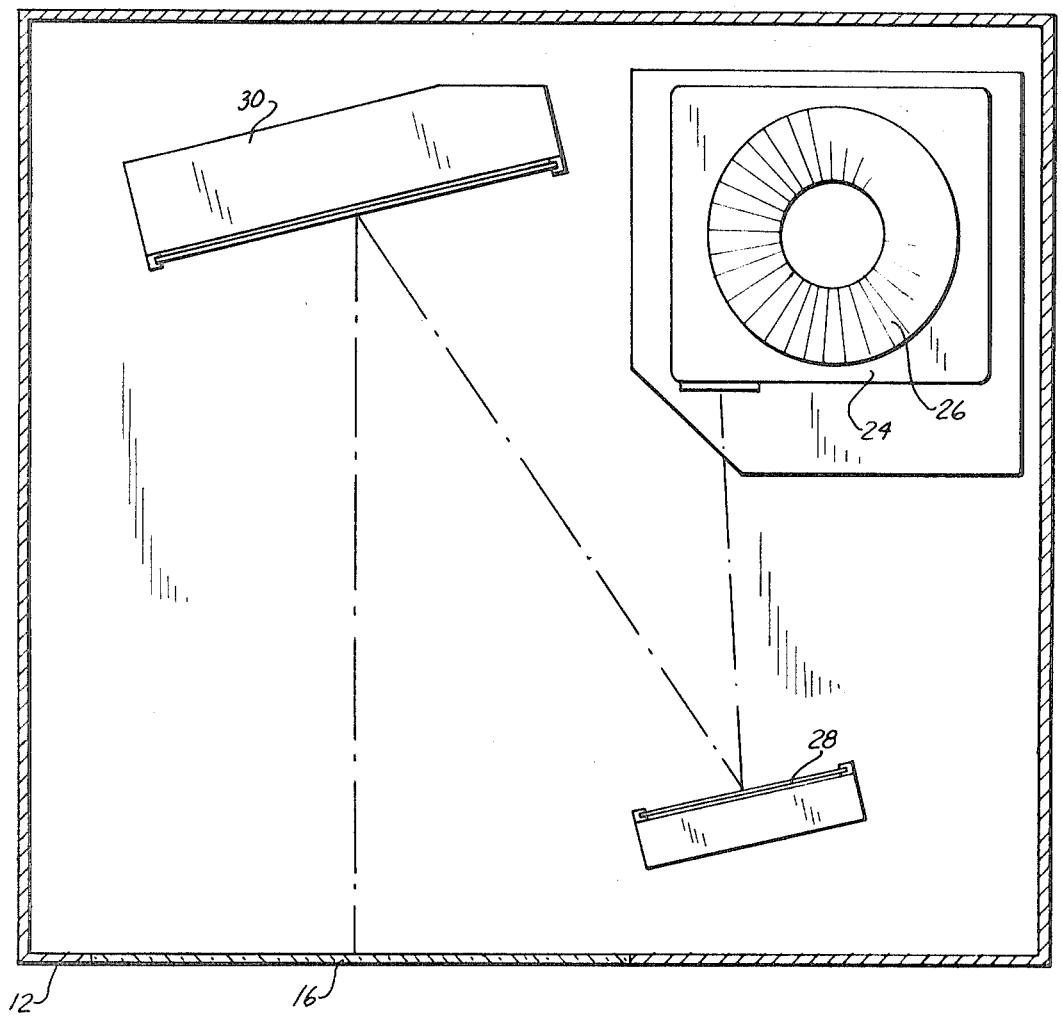
FIG. 3 is a sectional view taken along reference lines 3—3 of FIG. 2 in the direction indicated by the arrows.

The present device does not contain any of the internal electronics of an actual computer. In place thereof a slide projector 24 is contained within the support structure of the present device as shown in FIGS. 3 and 4. The projector 24 is focused on the back of panel 12 through suitable mirrors 28 and 30. Thus, by providing projector 24 with a suitable slide and turning the projector on, any particular portion of the sections 16 of the display panel may be made to appear to glow in a manner simulating the manner in which the front panel of the actual computer glows during a particular phase of its operation. In one successful practice of the invention, the projector utilized was a standard, commercially available "-Carousel" slide projector produced by the Kodak Corporation of Rochester, New York. This projector includes an automatic advance so that each time the projector is turned on the next slide in the slide tray 26 is projected on the rear of panel 12.

The simulator 10 also includes a commercially available card reader 33 such as the Model 2901A produced by AMP Inc. of Harrisburg, Pennsylvania. The card reader 33 is electrically interposed between the various buttons and switches on the front panel and the power supply of projector 24. The card inlet 35 to the reader 33 extends through the side panel 32 of the device along with the various controls 34, for the reader. Thus, the hole pattern in the card being "read" at a particular moment determines the manner in which the control elements 18, 20 and 22 of the device must be set in order to have the projector turn on. By providing suitable slides in tray 26, and properly indexing the slides to punchcards, a student may be required to perform a particular setting of the control elements which will result in the mock display panel becoming illuminated in a manner identical to that in which the actual computer would become illuminated if the same manipulations of its control elements occurred. In fact, the present device is designed for use with an instruction program wherein certain slides and punchcards are utilized and keyed to one another so that when a particular punchcard is in the punchcard reader and a slide is in the projector, the various control elements must be set in a manner identical to that in which the actual computer must be set to produce the same effect.

Figure 1:
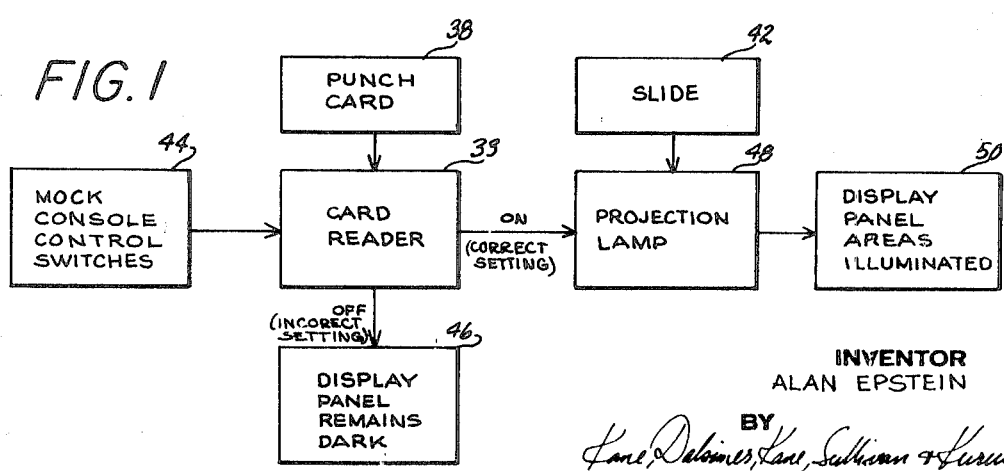
FIG. 1 is a block diagram representation of the operation of the teaching device of the present invention.

The operation of the present invention is shown schematically in FIG. 1. During the course of the teaching program, a particular punchcard 38 is positioned within card reader 33 and simultaneously the proper slide 42 is positioned in projector 24 for projection. The student is then asked to perform a particular function keyed to both punchcard 38 and slide 42 and requiring the setting of the various dials, knobs and pushbuttons 18, 20 and 22 comprising the control switch block 44. If an incorrect setting is made, the projector lamp 48 remains off and the display panel remains dark as shown in block 46. If the correct setting is made on the various control switches, the projector lamp 48 is turned on so that slide 42 is projected on the rear of front panel 12 causing certain predetermined areas of sections 16 and subsections 17 of the display panel to become illuminated and thereby simulate the illuminated panel of an actual computer which has been similarly set as shown in block 50.

As was previously mentioned, in a successful practice of the present invention a slide projector of the type designed to hold a plurality of slides and to automatically advance through the slides was selected and utilized. The teaching program utilized with the device included a stack of punchcards and a student was taught various manipulative steps in a sequential order with a study program that required the punchcards be fed into the punchcard reader in a manner coordinated with the arrangement of slides in the projector. As each succeeding manipulative step was successfully performed, the student would remove the previous punchcard and insert a new punchcard requiring that the next step in the study plan be performed before the projector again advanced.

In the preceding description, a teaching device simulating an IBM System 360 Computer was used for illustrative purposes only. It should be obvious that the operation of any other computer or similar device may be taught by suitably providing a simulator with a front panel similar to that of the desired computer.

Having thus Described my Invention, What is Claimed is:

1. A teaching machine for teaching the operation of an electronic device of the type provided with a plurality of adjustable control elements and a control panel display which includes a plurality of lights adapted to illuminate in a predetermined pattern in response to a particular setting of said control switches, said machine comprising:
   a. a support structure;
   b. a mock control panel display supported on said structure, said mock display having an overall configuration and appearance substantially identical to the electronic device display;
   c. a plurality of areas on said mock display, each of said areas occupying a position corresponding to the position of one of said lights on said electronic display;
   d. a plurality of switches equal in like and kind to said adjustable control elements mounted on said support structure;
   e. means for projecting an image on said mock display areas; and
   f. circuit means interconnecting said switches and said projecting means, whereby when said teaching machine switches are set in a pattern identical to a predetermined setting of said control elements, said projecting means is actuated to project an image on said mock display areas to cause said mock display areas to resemble the predetermined pattern of illuminated lights of said electronic device.

2. The invention in accordance with claim 1 wherein said projecting means comprises a film projector contained within said support structure, said mock display is formed of an opaque material, and said areas are formed of a translucent material, whereby an image projected on the rear of said areas may be viewed from the front of said display.

3. The invention in accordance with claim 2 wherein said film projector comprises a slide projector adapted to receive a plurality of slides and to sequentially advance through said slides with each actuation of said projector.

4. The invention in accordance with claim 1 wherein said circuit means includes a punchcard reader, and a punchcard having a hole pattern therein, which determines the switch settings necessary to activate said projecting means.